United States Patent [19]
Lebrun et al.

[11] Patent Number: 5,548,579
[45] Date of Patent: Aug. 20, 1996

[54] SYSTEM FOR EFFECTIVE ALLOCATION OF NETWORK-WIDE BANDWIDTH

[75] Inventors: Eric Lebrun, Saint Jeannet; Pascal Francois, Vence; Frederic Raimbault, Cagnes-Sur-Mer, all of France; Jeff Warren, Apex, N.C.

[73] Assignee: International Business Machines Corporation, Armonk, N.Y.

[21] Appl. No.: 493,066

[22] Filed: Jun. 21, 1995

[30] Foreign Application Priority Data

Jun. 23, 1994 [EP] European Pat. Off. .............. 94109763

[51] Int. Cl.$^6$ ..................................................... H04L 1/22
[52] U.S. Cl. ................................................... 370/16
[58] Field of Search .......................... 370/85.1, 84, 85.4, 370/85.5, 85.13, 85.14, 85.15, 16, 16.1, 17, 118, 58.3; 340/825.05, 827; 395/181, 182.02, 182.01, 182.08, 182.09

[56] References Cited

U.S. PATENT DOCUMENTS 5,136,581  8/1992  Myehycke ............................ 370/58.1
5,461,611  10/1995  Drake, Jr. et al. ..................... 370/17
5,479,404  12/1995  Francois et al. ....................... 370/84

*Primary Examiner*—Douglas W. Olms
*Assistant Examiner*—Ajit Patel
*Attorney, Agent, or Firm*—Gerald R. Woods

[57] ABSTRACT

To address Quality of Service (QoS) requirements in a domain of Local Area Networks(LANs) interconnected by at least one FDDI segment, network-wide bandwidth allocation is improved by a high availability Third Party Requestor (3PR) agent. The 3PR receives from the QoS Allocator all information that it needs to ask for bandwidth reservation on the FDDI segment. Following a Station Management standard, the 3PR is able to act on behalf of an FDDI station that will submit synchronous traffic and ask for bandwidth allocation to a Synchronous Bandwidth Allocator (SBA). According to the SBA decision, the 3PR will then answer to the network-centralized QoS Allocator which will grant or deny the allocation over the whole path within the LAN domain. If for some reason, the acting SBA function moves to another station, the 3PR at the new station will become active.

3 Claims, 9 Drawing Sheets

PMF= Parameter Management Frame
RAF= Resource Allocation Frame
3PR= Third Party Requestor
NRR= Network Resource Reservation

SYSTEM FOR EFFECTIVE ALLOCATION OF NETWORK-WIDE BANDWIDTH

FIELD OF THE INVENTION

The present invention relates to the data communication field and more particularly to a system for effectively allocating network-wide bandwidth in a network including at least one FDDI (Fiber Distributed Data Interface) segment.

BACKGROUND OF THE INVENTION

There is a developing requirement in the data communication field that multimedia applications be able to run over interconnected networks. More particularly, there is a developing requirement that the network be capable of meeting the needs of multimedia applications for guaranteed bandwidth and end-to-end maximum delays, i.e,. what is called a Quality of Service (QoS) requirement. Such QoS requirements imply that an interconnected network must be able to manage the available network bandwidth and response time even though these parameters are likely to change over time in ways that might normally impact the communication quality.

A known FDDI standard describes a dual counter-rotating fiber-optic ring operating at 100 MBps. A FDDI ring may be used in a network as a very high-speed backbone interconnecting Local Area Networks (LANs). The allocation of network-wide bandwidth over such an interconnected LAN domain is dealt with in European patent application 93480041.8 filed on Apr. 19, 1993, by the assignee of the present invention, the teachings of which are incorporated herein by reference. To manage the reservation of certain levels of QoS in such an interconnected LAN domain, two functional components are employed: an Allocator and a Requestor. The Allocator is the component responsible for maintaining an awareness of the capacity of the LAN components (i.e. bridges and segments) so that a determination can be made whether a particular request for a bandwidth allocation can be granted. The Requestor is the component responsible for making a request to reserve a certain QoS for an application.

On an FDDI segment, however, QoS requirements must be satisfied by usage of synchronous traffic. A Synchronous Bandwidth Allocator (SBA) is defined in European patent application 93480221.6 filed on Dec. 8, 1993 by the assignee of the present invention. The SBA is responsible for allocating synchronous bandwidth to applications requiring guaranteed bandwidth and predictable delay. A single SBA manages an FDDI segment, each FDDI segment has one and only one SBA actively managing all synchronous traffic. This reference teaches slave SBA agents which can monitor the FDDI segment and take on the role of a master SBA agent when needed to assure high availability of the SBA agent function.

To enable the two bandwidth allocation processes (the centralized allocation process from the QoS Allocator and the SBA agent process over FDDI segment) to coexist over the interconnected LAN domain, European patent application 93480041.8 discloses the use of a Third Party Requestor (3PR) agent. The 3PR agent receives from the QoS Allocator all information that it needs to ask for bandwidth reservation on the FDDI segment. The 3PR agent is able to act on behalf of the FDDI station that is the expected source of synchronous traffic and ask that bandwidth be allocated to the SBA. Depending on the SBA response, the 3PR agent will then respond to the QoS Allocator which will grant or deny the allocation over the whole path.

SUMMARY OF THE INVENTION

The present invention solves a problem which might otherwise result from a failure of the 3PR agent on a FDDI segment. The concept of master and slave 3PR agents is employed to assure high availability of 3PR function. A master 3PR agent is responsible for providing an interface between the Qos Allocator and the SBA as described above. In accordance with the present invention, when the user first enables a 3PR agent, the system brings the newly-enabled 3PR agent either to an ACTIVE state where it acts as the master 3PR agent or possibly to a new 3PR state called a BACKUP state where the newly enabled 3PR agent becomes ready to replace the existing master 3PR agent if the master 3PR agent fails, or even to a STANDBY state if master and backup 3PR agents already exist. The decision to go to ACTIVE, BACKUP or STANDBY state is directly dependent on the state of the SBA in the same station as the newly enabled 3PR agent. The newly enabled 3PR agent is set to the same state as the SBA in the same station. Having the 3PR agent and the SBA in the same station prevents increased traffic over the FDDI segment and is more efficient since allocation requests/responses go to the same station. If the SBA function moves to another station, usually as a result of station failure or planned maintenance operations, the 3PR function follows as well and starts on the station to which the SBA function was moved.

BRIEF DESCRIPTION OF THE DRAWINGS

While the specification concludes with claims that particularly point out and distinctly claim that which is regarded as the present invention, details of a preferred embodiment of the invention may be more readily understood from the following detailed description read in conjunction with the following drawings wherein:

DETAILED DESCRIPTION

The FDDI standard is well-known and is described in a number of publications, including European patent application 93480221.6.

Figure 1:
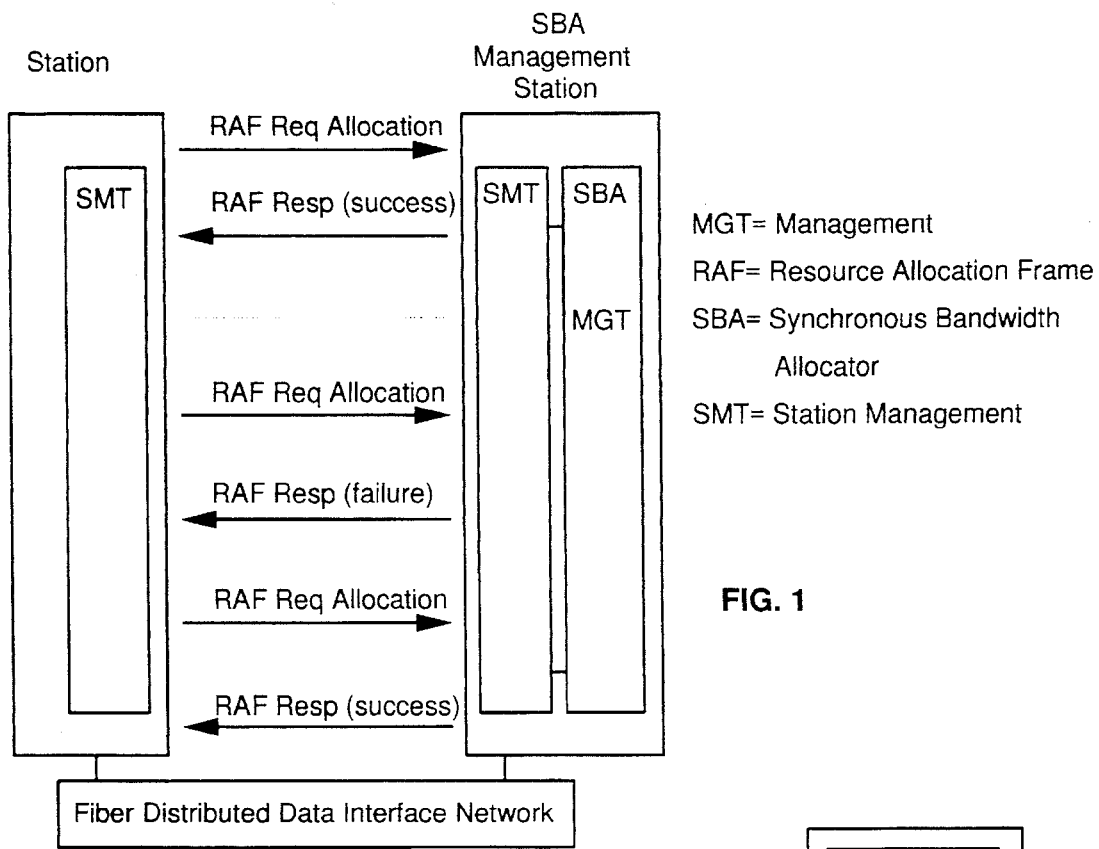
FIG. 1 shows the allocation of bandwidth over an FDDI segment.

The allocation of Synchronous Bandwidth over an FDDI network is performed by using the known Resource Allocation frame protocol. This protocol assumes one central allocator of the Synchronous Bandwidth resource. The protocol provides for the management of the central allocator, the detection of overallocation, and recovery from faults due to over-allocation. FIG. 1 shows an example of an allocation of Synchronous Bandwidth. A station must receive an allocation of Synchronous Bandwidth before initiating synchronous transmission. A station that wants to change its current allocation of Synchronous Bandwidth must request the new allocation amount from the Synchronous Bandwidth Allocator Management station. To request a change in allocation, a station sends an Resource Allocation frame Request (Request Allocation) to a Synchronous Bandwidth Allocator Management station. A Synchronous Bandwidth Allocator Management station will respond with an Response granting or denying the request. If the request is denied, the requesting station may adjust its allocation request to within the available bandwidth specified in the response frame and restart the exchange. The Station changes its recorded Synchronous Bandwidth attributes (i.e., in a MIB or Management Information Base) when response grants the allocation request.

The SBA application is responsible for allocating synchronous bandwidth to applications requiring guaranteed bandwidth and predictable delay. Each FDDI segment has one and only one SBA application which actively manages all synchronous traffic on that segment. If this SBA application fails and is not replaced, no additional allocations would be allowed and no changes in existing allocations could be made. The synchronous allocation request processing is straight forward, whereas the process of deallocation due to over-utilization or inconsistencies is not. The SBA complexities are in various SBA Actions where deallocations are generated and in the allocation data structures where many SBA parameters are maintained.

The SBA functions required in the FDDI Synchronous Implementer Agreement (IA) are listed below with an example SBA state diagram detailing the IA implementation.

Maintain an SBA Allocation MIB

These data structure(s) maintain all the necessary SBA information used by the SBA state diagram. The SBA state diagram example identifies important elements of these data structures. The SBM internal state diagram uses a notation to identify which end-station sub structure is or shall be modified. An example of the information maintained in an SBA data structure for a synchronous end-station is.

Active individual MAC allocation(s), i.e. payload

TimeStamp of latest allocation modification (+/−) used in report actions

SBA Category requirement, used in recovery actions

Max_T_Neg, used in allocate and recovery actions

Min_Segment_Size, used in allocate and recovery actions

Variety of flags, signals, counters, and timers.

Recover from

T_Neg change causing over-utilization

T_Neg change causing Segment_Size violations

Reconfigurations causing over-utilization

Other required SBA functionality includes

Payload consistency check via SBA Reporting

MIB consistency check via NIF request (Station_ State)

SBA Available Policy defaulting

Control fddiMACT-Neg via local access of fddiMACT-Req

Figure 17:
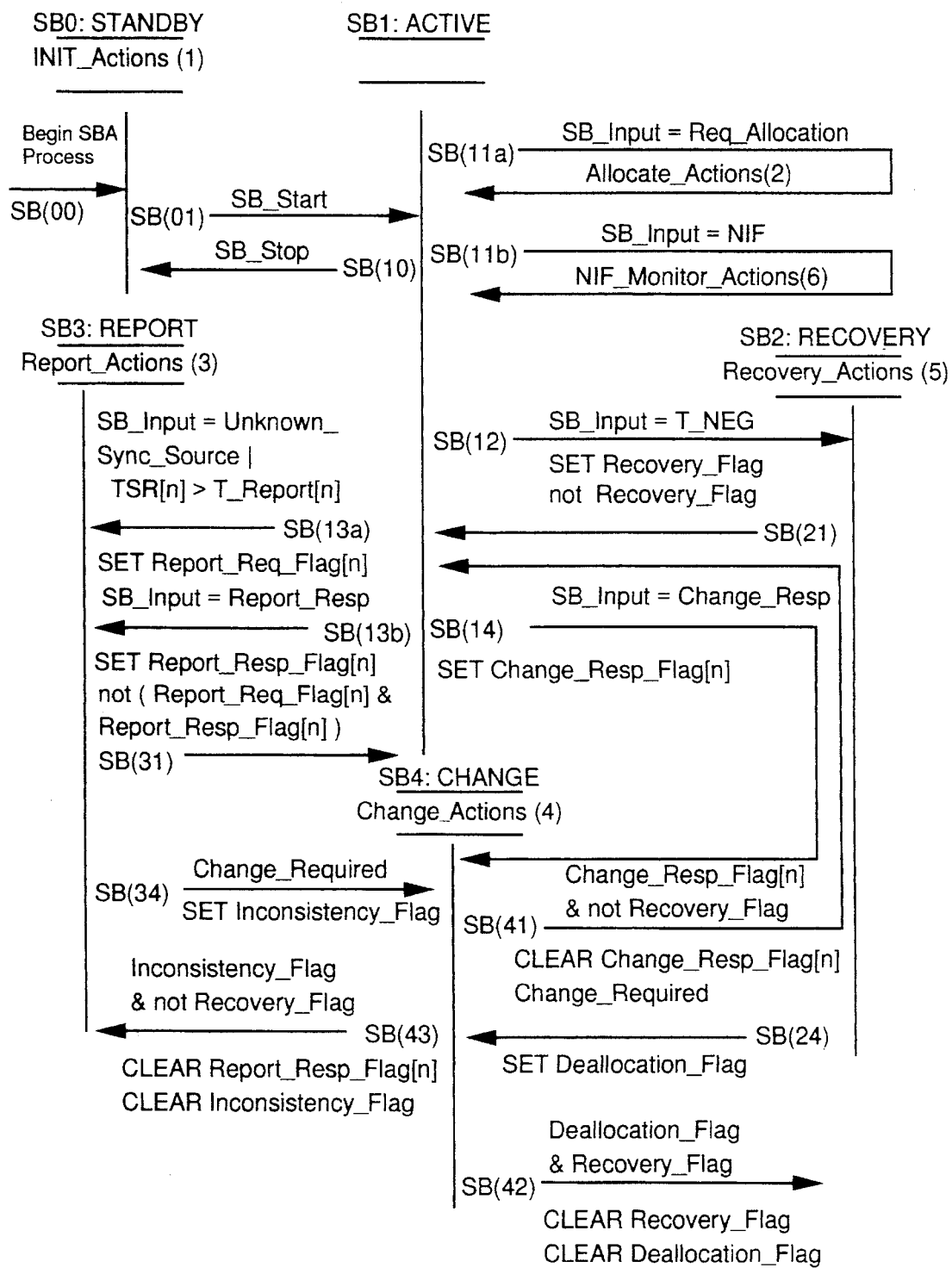
FIG. 17 shows SBA states.

The purpose of the Synchronous Bandwidth Management (SBM) function is to control synchronous allocations on a single FDDI segment. Allocations are limited to the primary FDDI ring. The amount of available synchronous bandwidth is set in the SBA_Available parameter. The SBM provides recovery mechanisms to recover unused bandwidth, and resolves T_Neg and reconfiguration changes. Many of the SBM state diagram inputs are provided by the underlying FDDI sub-system supporting it. FIG. 17 shows an example of SBA state machine.

STATE SB0: STANDBY

The SBA process begins with transition SB(00) where SBM enters the Standby State. In this state, the SBM waits for the assertion of SB_Start, this occurs after SBA initializes the SBA application.

SB(01)Start SBAManager

STATE SB1: ACTIVE

The SBA monitors the FDDI segment from the Active State. Normally SBA is in this state unless an active allocation is being refreshed or SBA is recovering from an overallocation condition.

SB(10): StopSBAManager

SB(11a): AllocationRequest

SB(11b): NIFMonitoring

SB(12): PotentialRecoveryRequired

SB(13a): ReportAllocation

SB(13b): ProcessReportResponse

SB(14): ProcessChangeResponse

STATE SB2: RECOVERY

The Recovery state indicates SBM has detected a T_neg change potentially requiring a de-allocation of synchronous bandwidth. Entering this state causes SBM to re-evaluate all active allocations contained within the SBA MIB.

SB(21): RecoveryCompleted

SB(24): RecoveryDeallocation

STATE SB3: REPORT

The Report state is used to refresh active allocations and to perform active allocation consistency checks. The consistency checking is necessary to recover unused synchronous allocations when the end-station has been removed from the ring prior to deallocating its bandwidth.

SB(31): Report Complete

SB(34): InconsistencyDetected

STATE SB4: CHANGE

The Change state is used by SBM to issue an SBA RAF Change allocation frame. Entry into this state occurs when Report Actions detect an allocation inconsistency or the Recovery Actions require a de-allocation to recover from a ring over-allocation condition or when an SBA RAF Change Allocation response has been received.

Figure 18A:
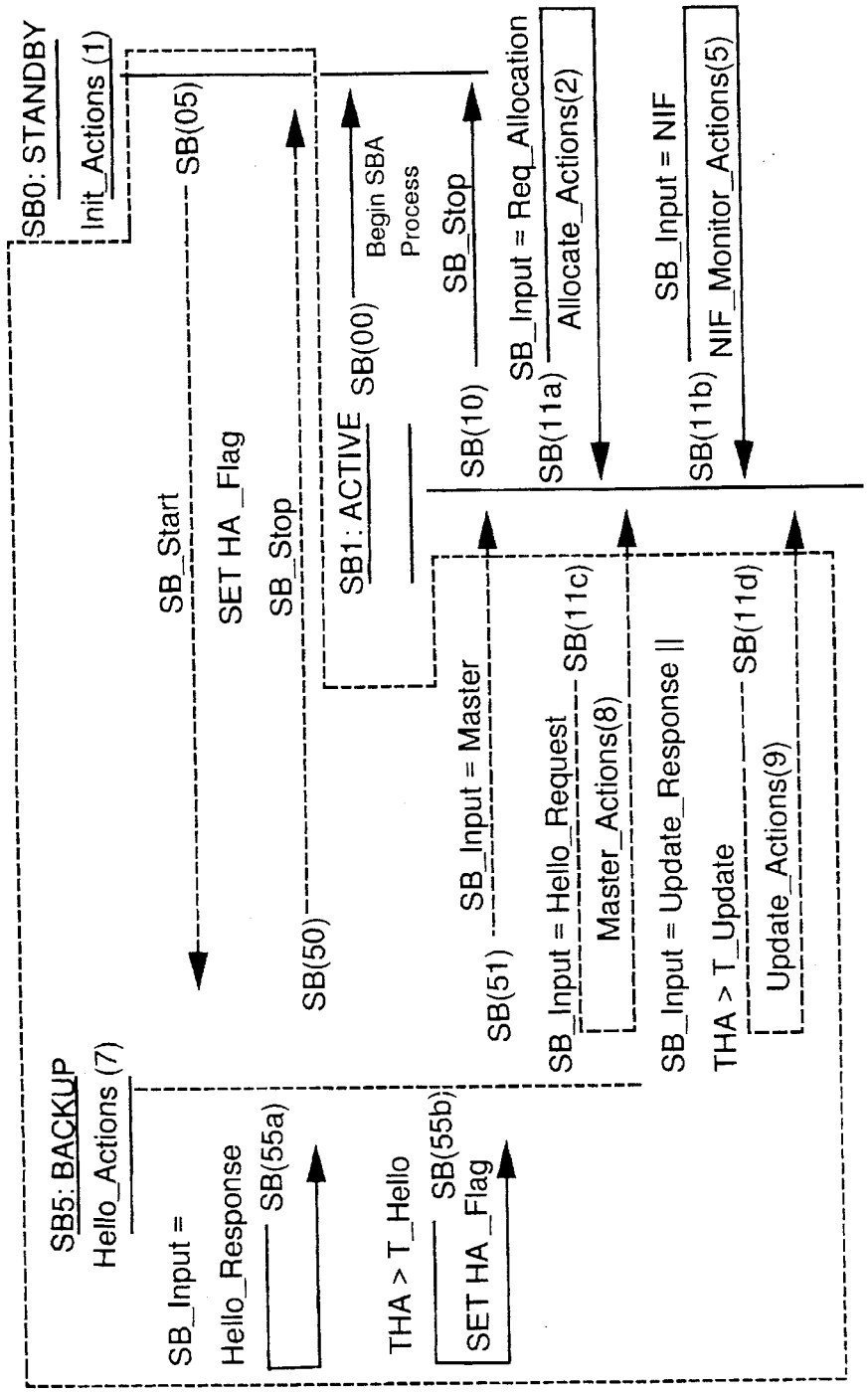
FIG. 18 shows SBA states in a high availability system.
Figure 18B:
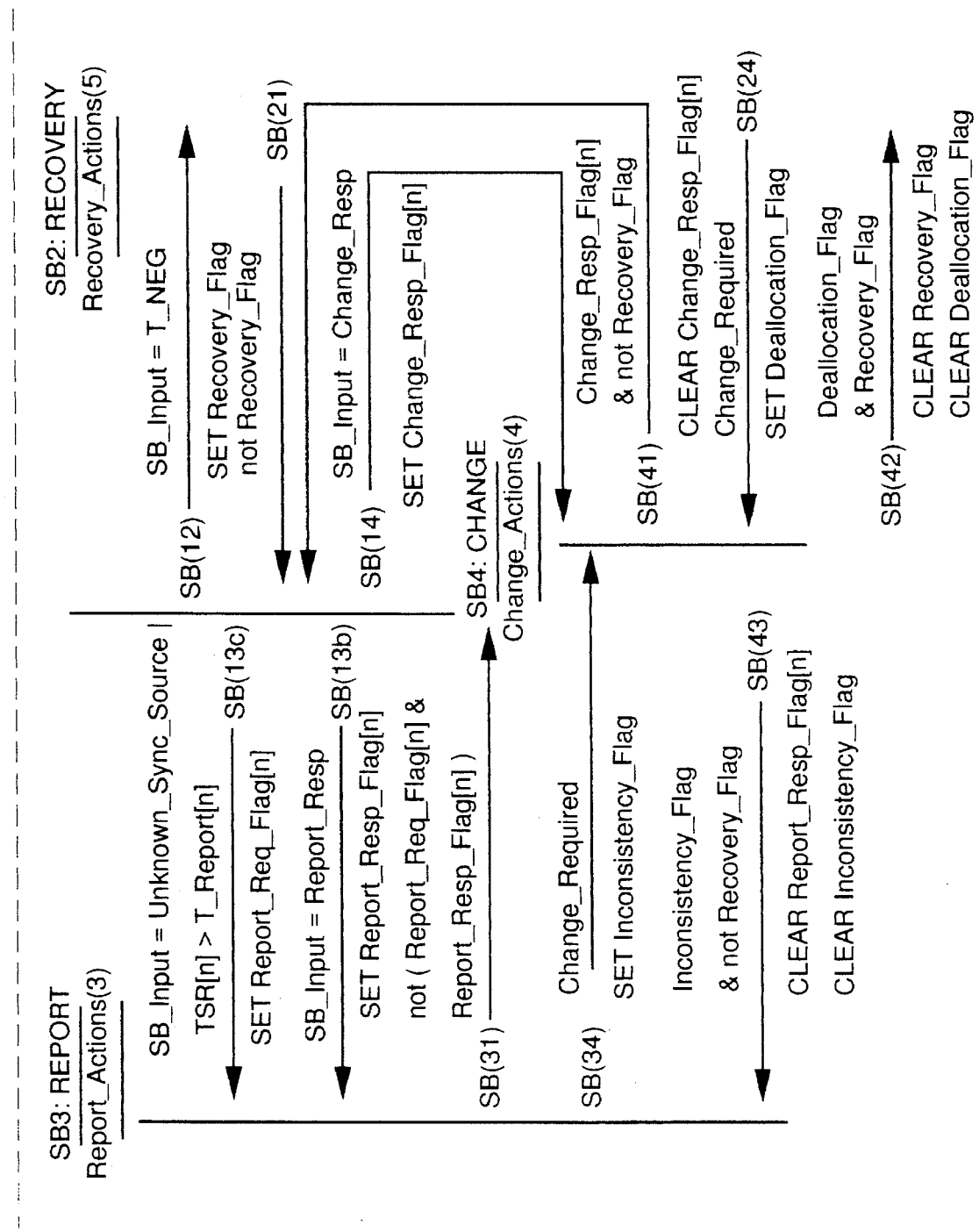

SB(41): Completed Deallocation
SB(42): PotentialAdditionalRecoveryRequired
SB(43): ContinueReportProcess The failure of an SBA application is addressed by Highly Available Synchronous Bandwidth Allocator. A Highly Available Synchronous Bandwidth Allocator provides extensions to the FDDI Synchronous Implementer's Agreement. In particular the SBA Internals section is modified to allow slave SBA applications to monitor the FDDI segment and take on the role of master SBA when needed (see FIG. 18). The concept of a master and slave allocator is used in the high availability SBA model. The master SBA is the SBA responsible for granting or denying allocation requests as well as managing disturbances resulting from network changes, such as changes in token rotation delays. The master SBA will communicate with the slave SBA (if present) to update the slave with current allocation information. These updates are communicated from master to slave via an extended service frame protocol. The updates occur when allocations are modified.

When the user enables this SBA application, the underlying SBA state machine enters a new SBA state called BACKUP state as opposed to directly going to the Active or Master state. The Active state is now for one and only one SBA application, the master SBA. The purpose of this new state is to learn if a master and/or slave are currently operational. The newly enabled SBA application learns if other SBA applications are present by using an SBA_Hello Request/Response process. This allows a redundant SBA application (the slave SBA) to keep a shadow copy of the master's SBA MIB. If the master fails, the FDDI segment is without an SBA manager for three minutes if a slave SBA is present. Detection of the master failure occurs when the slave fails to receive three consecutive master present announcements. When the slave detects a master failure, it transitions to the Active state where it assumes the role of master. If the slave does not have all of the master's SBA MIB, the slave the acquires the remaining data using the SBA report request protocol.

More details with respect to SBA and highly available SBA are available in European patent application 93480221.6.

Figure 2:
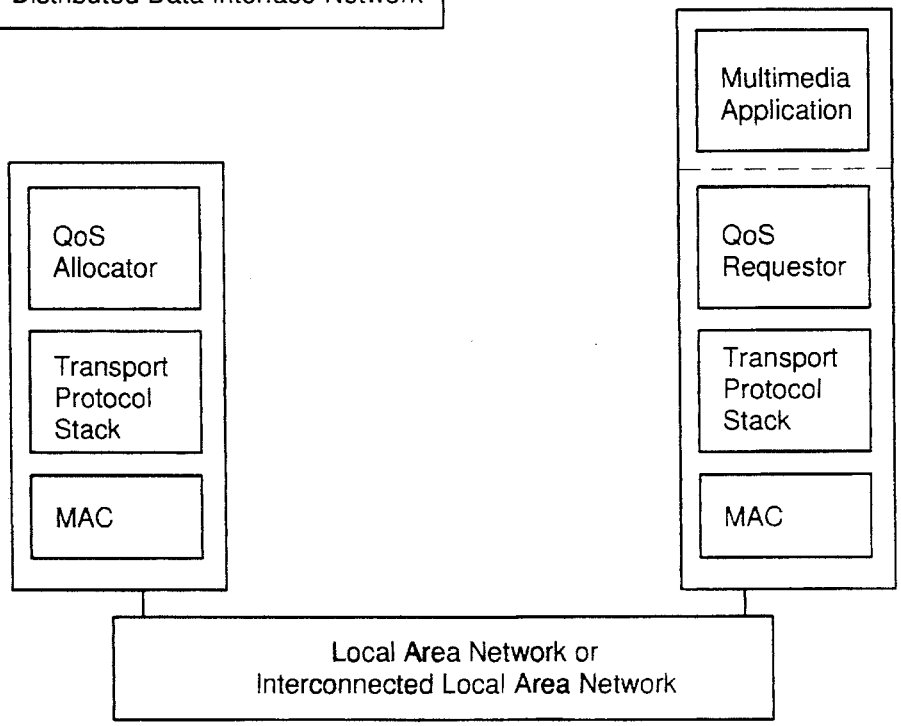
FIG. 2 illustrates the structure of QoS Allocator and QoS Requestor over Local Area Network.

The following is a description of the functional components and the associated protocols required for Quality of Service Management on Local Area Network (Network Resource Reservation - NRR. NRR includes two components, a QoS Requestor and a QoS Allocator as well as the protocols that are exchanged between a Requestor and the Allocator. A QoS Requestor is needed for all LAN stations that want to send traffic requiring Quality of Service guarantees (e.g. multimedia traffic). Only a single QoS Allocator is required for a given bridged Local Area Network. FIG. 2 depicts the QoS Requestor and QoS Allocator structure on a Local Area Network.

The QoS Requestor includes the following functions:
Accepts a request for a specified Quality of Service in data transfers from a specified source of LAN traffic (i.e., a multimedia application) to a specified destination on the LAN;
Formats and forwards the request to the QoS Allocator on the LAN;
Receives the result of a Quality of Service request from the QoS Allocator and informs the application of the result of the request;
Maintains information about Quality of Service requests that have been granted by the Quality of Service Allocator to the Quality of Service Requestor.

The Quality of Service Allocator includes the following functions:
Accepts a request from Quality of Service Allocator Requestor for a specified Quality of Service from a specified source (or station) to a specified destination on the LAN
Examines a Quality of Service request and the current status of allocated Quality of Service to determine whether the network can provide the specified Quality of Service. QoS Allocator gets that information from the 3rd Party Requestor;
Based on the calculation, decides whether to grant or reject the Quality of Service request.
Maintains information about the status of Quality of Service that has been allocated in the LAN and about the capacity of the network to support Quality of Service reserved streams.

Figure 3:
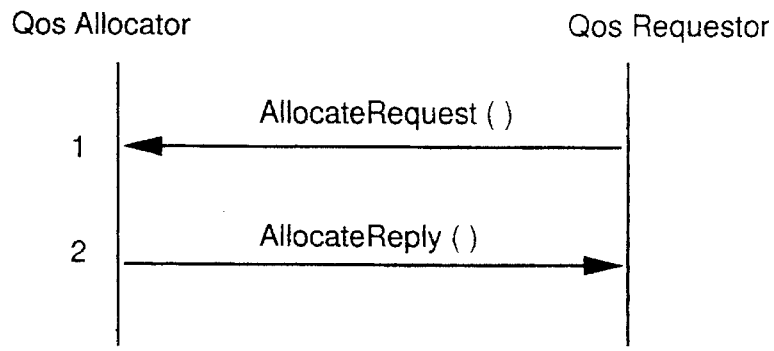
FIG. 3 shows the Qos Allocation process between the QoS Requestor and the QoS Allocator.
Figure 4:
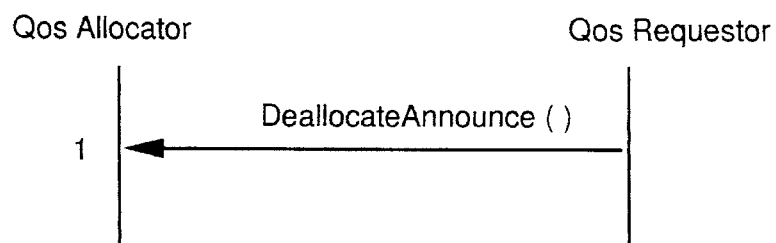
FIG. 4 shows the Qos Deallocation process between the QoS Requestor and the QoS Allocator.
Figure 5:
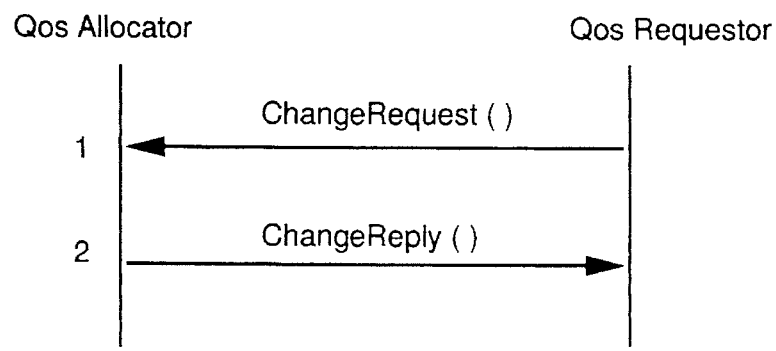
FIG. 5 shows the Qos Change Allocation process between the QoS Requestor and the QoS Allocator.
Figure 6:
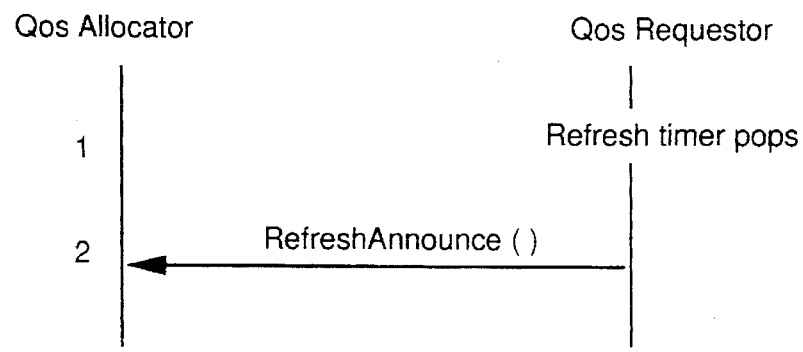
FIG. 6 shows the Qos Refresh process between the QoS Requestor and the QoS Allocator.
Figure 7:
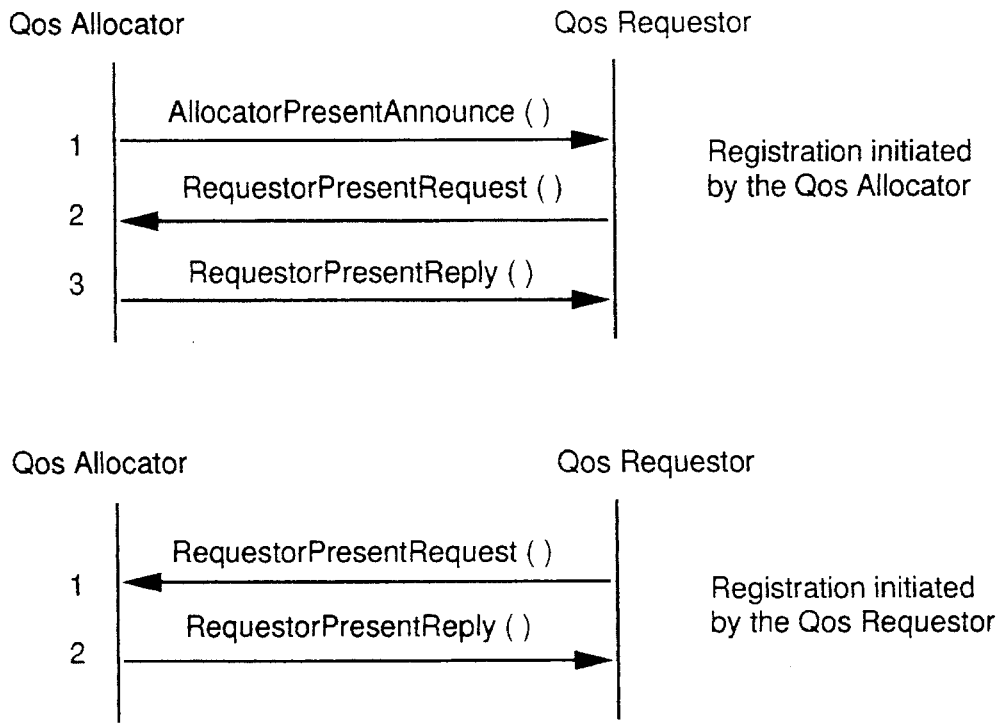
FIG. 7 shows the Qos Registration process between the QoS Requestor and the QoS Allocator.

The Qos Management protocol enables a Quality of Service Requestor entity to register with a Quality of Service Allocator entity in the network, and to interact with the Quality of Service Allocator to manage network QoS for data streams. FIG. 3 shows QoS Allocation; FIG. 4 shows QoS Deallocation, FIG. 5 shows a change of QoS Allocation, FIG. 6 shows a Refresh of bandwidth, and FIG. 7 shows the Registration Protocol.

The 3rd Party Requestor or 3PR agent solves the problem raised by the allocation of synchronous bandwidth on a FDDI segment when this allocation is done by a centralized allocator in an interconnected LAN domain.

This centralized allocator (QoS Allocator) is responsible for allocation on a network-wide basis, whatever the protocol used between the two points exchanging synchronous traffic. But to be able to do this, the QoS Allocator needs to interact with agents responsible for bandwidth allocation on every FDDI segment: namely the Synchronous Bandwidth Allocator. The interface between the QoS Allocator and each Synchronous Bandwidth Allocator is provided by the 3PR function. The 3PR function receives from the QoS Allocator all information that it needs to ask for bandwidth reservation on its own FDDI segment. The 3PR function is able to act on behalf of the FDDI station that will be the source of the synchronous traffic and ask for bandwidth be allocated to the Synchronous Bandwidth Allocator. Depending on the SBA allocation decision, the 3PR will then respond to the QoS Allocator which will grant or deny the allocation over the whole path.

Figure 8:
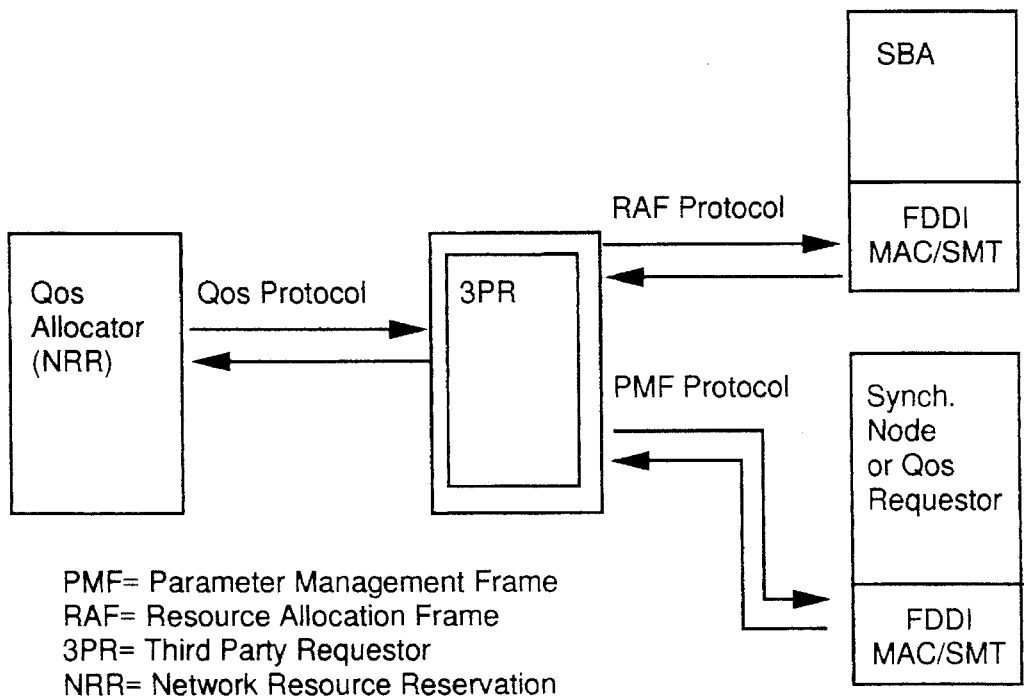
FIG. 8 shows the relationship between the 3PR agent, the SBA, the QoS Requestor and the QoS Allocator.

The 3rd Party Requestor enables the two bandwidth allocation processes (the centralized allocation process from the QoS Allocator and the Synchronous Bandwidth Allocator for FDDI segments) to coexist in the same network. The FDDI bandwidth allocation process is defined by a Station Management standard defined by American National Standards Institute. It uses specific frames, named Resource Allocation Frames (RAF frames). FIG. 8 shows the environment for 3rd Party Requestor. The 3rd Party Requestor receives requests from the QoS Allocator, like 'Allocation Request' or ChangeRequest'. Before answering by 'AllocationConfirm' or 'ChangeConfirm', the 3rd Party Requestor should consult the Synchronous Bandwidth Allocator responsible for the FDDI segment.

The 3rd Party Requestor includes the following functions:
Registration:
Exchange network addressing information with the QoS Allocator Translation of allocation request:
  Receive the QoS Request from the QoS Allocator (NRR)
  Format and forward the request to the Synchronous Bandwidth Allocator
  Receive the response from the Synchronous Bandwidth Allocator.
  Format and forward the response to the QoS Allocator
Setting of allocation in the synchronous node:
  Update the SBA MIB attributes of the synchronous node according to the response of the Synchronous Bandwidth Allocation
Monitoring of the FDDI ring:
  Notify the QoS Allocator in case of FDDI ring modification (T_Neg change, SBA_Available change, SBA_Allocatable change . . . )

The QoS Management frame is used by the NRR Allocator to send QoS messages to the 3rd Party Requestor, and in return the 3rd Party Requestor will use the same type of frame to make the response.

The SMT RAF frame is used by the 3rd Party Requestor to request allocation of bandwidth to the SBA. and in return the SBA will use the same type of frame to make the response. The SMT PMF frame is used by the 3rd Party Requestor to obtain and set SBA MIB attributes to the Synchronous Node (or NRR Requestor), and the Requestor uses the same type of frame to make the response.

Figure 9:
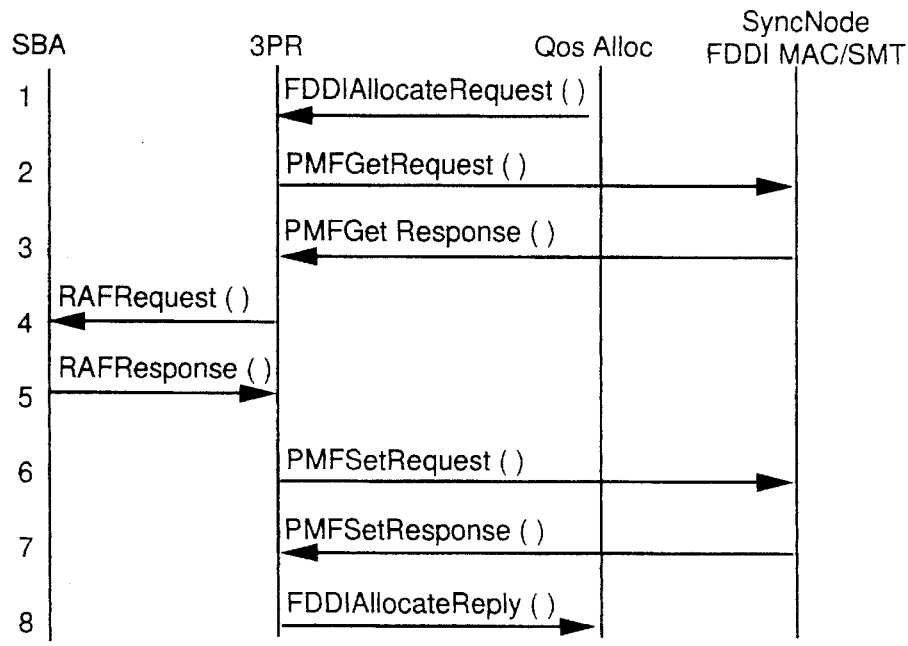
FIG. 9 shows the FDDI Allocate process between the 3PR agent and the QoS Allocator.

FDDIAllocate The NRR Allocator initiates a request for QoS for a particular data stream over an FDDI segment, by sending an FDDIAllocateRequest message to the 3rd Party Requestor. After processing the request the 3rd Party Requestor returns an FDDIAllocateReply message. This is shown FIG. 9.

Figure 10:
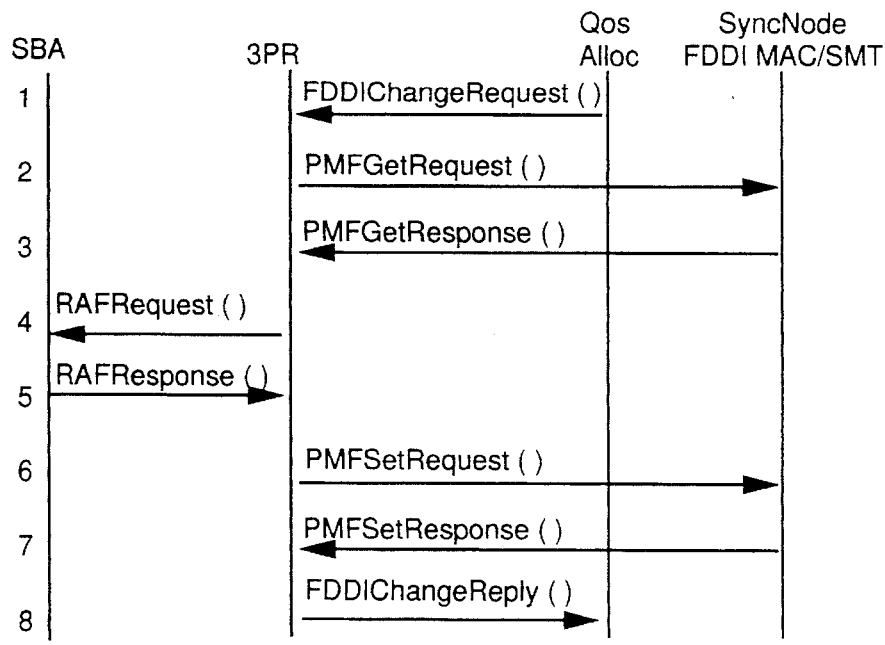
FIG. 10 shows the FDDI Change process between the 3PR agent and the QoS Allocator.

FDDIChange The NRR Allocator initiates a request for a change in an existing QoS allocation for a FDDI data stream by sending an FDDIChangeRequest message to the 3rd Party Requestor. After processing the request the 3rd Party Requestor returns an FDDIChangeReply message. This is shown FIG. 10.

Figure 11:
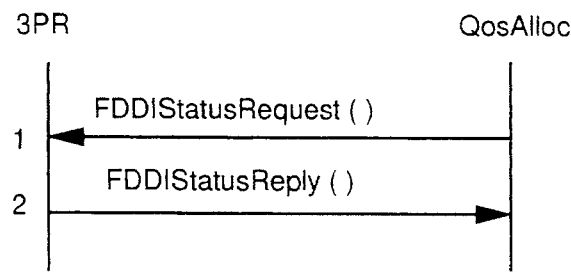
FIG. 11 shows the FDDI Status process between the 3PR agent and the QoS Allocator.

FDDIStatus When at least one of the following events occurs:
  T_Neg change
  SBA_Available change
  SBA_Allocatable change
the 3rd Party Requestor initiates a FDDI Status by sending a FDDIStatusRequest message to the NRR Allocator, and in return the NRR Allocator sends a FDDIStatusReply message. The detection of T_Neg Change shall be done by monitoring the MIB attribute fddiMACT_Neg, because this attribute is updated at each Token Rotation Time (TRT) negotiation. The detection of SBA_Allocatable Change shall be done by checking the SBA Allocatable parameter in all RAF Request Allocation Response. This is shown FIG. 9 or 10. The detection of SBA_Available Change shall be done by monitoring the MIB attribute fddiPATHSbaAvailable, because this attribute is set at each SBA initialization. It is to be noted that after the registration flow, the 3rd Party Requestor should send a FDDIStatusRequest with SBA Allocatable, SBA Available, and T_Neg parameters in order that QoS Allocator get these values before to process any requests. This is shown FIG. 11.

Figure 12:
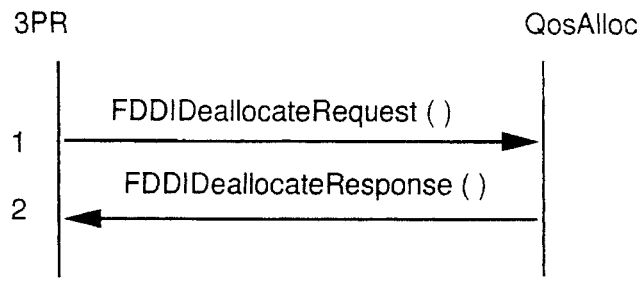
FIG. 12 shows the FDDI Deallocate process between the 3PR agent and the QoS Allocator, when initiated by the 3PR agent.
Figure 13:
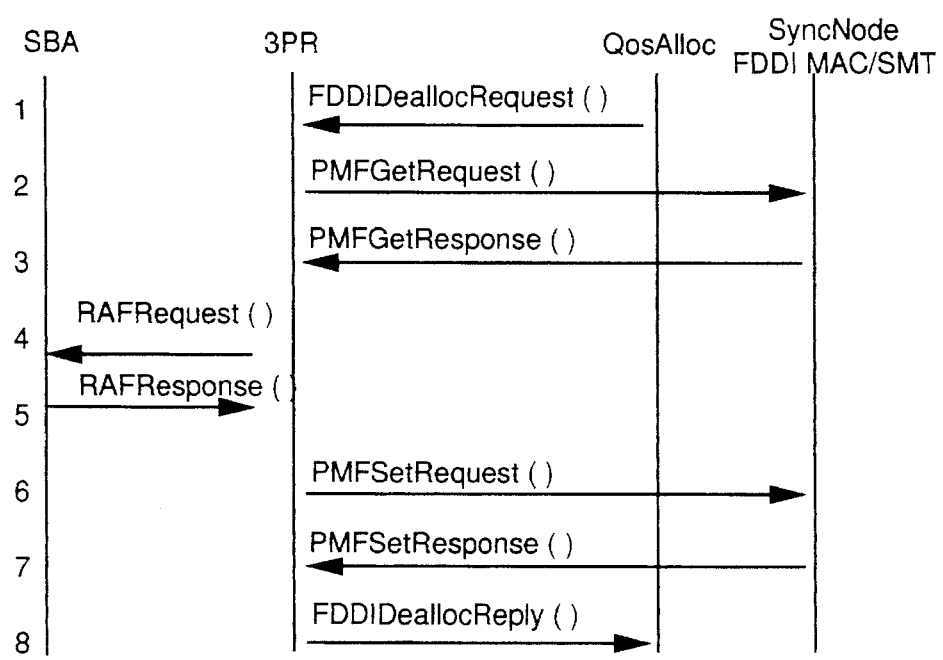
FIG. 13 shows the FDDI Deallocate process between the 3PR agent and the QoS Allocator, when initiated by the NRR (QoS Allocator)

FDDIDeallocate
  When initiated by 3rd Party Requestor (FIG. 12):
    The 3rd Party Requestor notifies the QoS Allocator for all allocation changes initialized by the SBA. Also the 3rd Party Requestor processes all RAF Change Allocation Response to detect an allocation change.
    The 3rd Party Requestor initiates a request for a deallocate in an existing QoS allocation for a particular data stream by sending a FDDIDeallocateRequest message to the NRR Allocator.
  When initiated by QoS Allocator (NRR) (FIG. 13):
    The QoS Allocator should report the deallocation of a QoS stream by sending a FDDIDeallocateRequest message to the 3rd Party Requestor.
    After processing the request the 3rd Party Requestor returns an FDDIDeallocateReply message.

Figure 14:
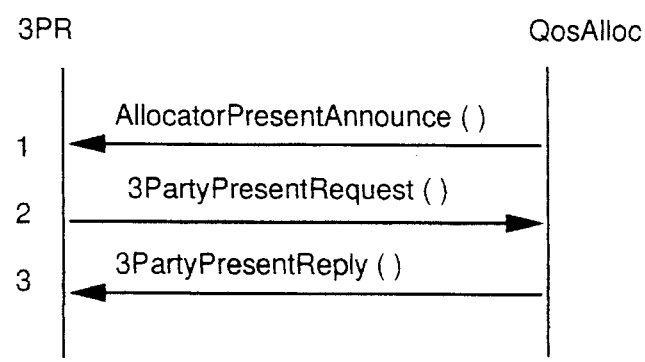
FIG. 14 shows the Registration process between the 3PR agent and the QoS Allocator, when initiated by the NRR.
Figure 15:
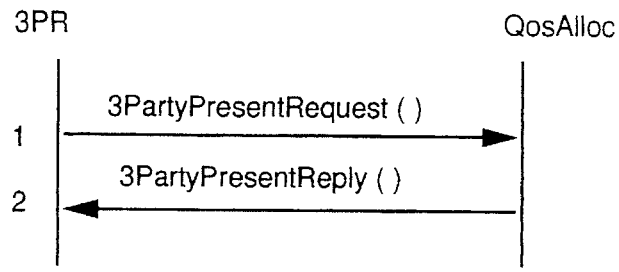
FIG. 15 shows the Registration process between the 3PR agent and the QoS Allocator, when initiated by the 3PR.

Registration
Registration flows enable a NRR Allocator and 3rd Party Requestor to exchange network addressing information and the 3rd Party Requestor to pass other information to the Allocator. The NRR Allocator or the 3rd Party Requestor may initiate the flows.
  When initiated by QoS Allocator (NRR) (FIG. 14):
    As an example of Allocator-initiated registration, when the NRR Allocator is initialized it can send an AllocatorPresentAnnounce message in broadcast address. As an example of 3PR-initialized registration, when the 3PR is initialized it may send a 3PartyPresentRequest message in broadcast address in order to obtain QoS management parameters from the Allocator.
  When initiated by 3rd Party Requestor: see FIG. 15.

Figure 16:
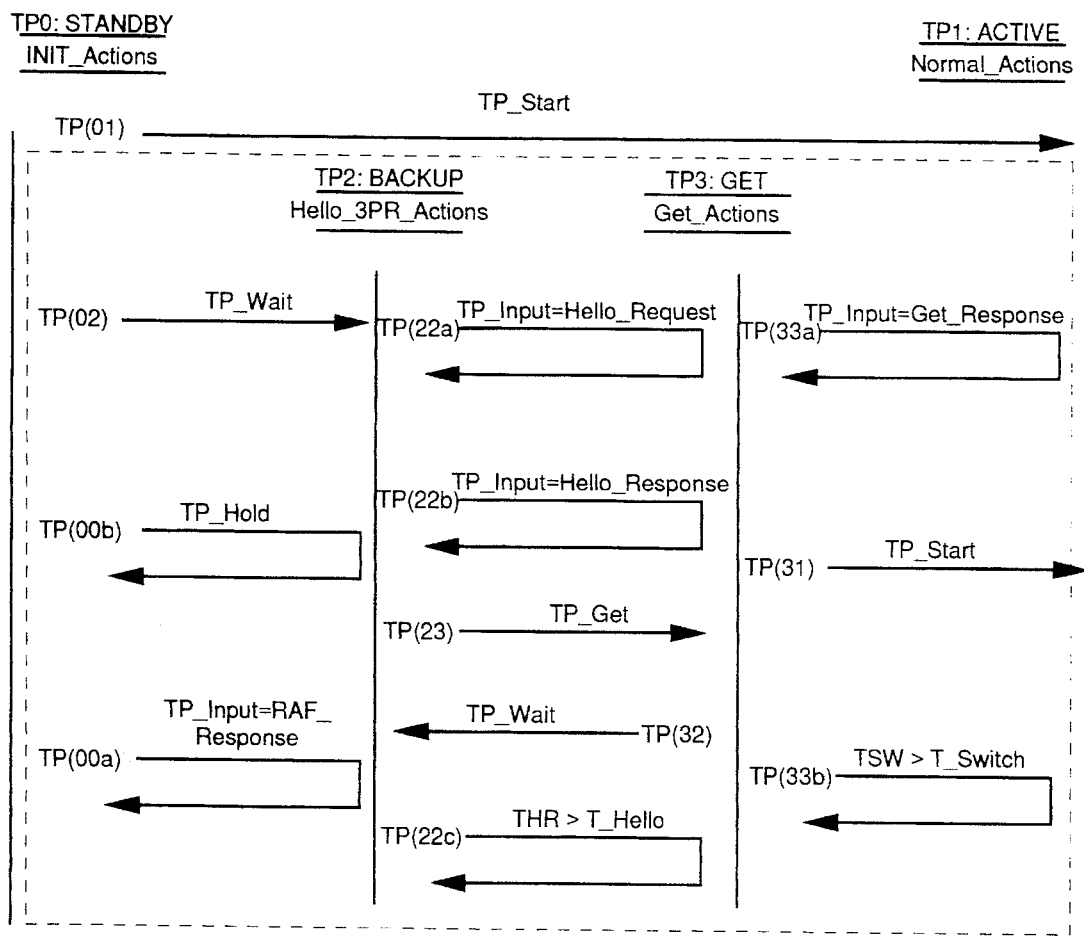
FIG. 16 shows Init_actions in accordance with the present invention for the HA_3PR agent.

The following describes the modified 3PR state machine which establishes high availability 3PR (HA-3PR) functionality. The High Availability 3PR state machine is depicted in FIG. 16. During the setup of the HA-3PR the Init_Actions listed below are performed upon the STANDBY state:

```
/* TP(00a) */
    IF(Begin_Flag)
        THEN
            BEGIN
                send RAF Request Allocation request (with
                SbaPayload = 0)
                clear Begin_Flag
            END
/* TP(00c) */
    IF(TP_Input == RAF_Response)
        THEN
            BEGIN
                IF(SBA_Master_Address ==
                My_Address)
                    THEN
                        BEGIN
                            signal TP_Start/* TP(01) */
                        END
            IF(SBA_Master_Address != My_Address)
                THEN
                    BEGIN
                        /* Obtain SBA_Slave_Address by */
                        /* sending a PMF Get for attribute */
                        /* ibmPATHHA_Slave_Addr */
                        send PMF Get request (ibmPATHHA_Slave_Addr)
                    IF(SBA_Slave_Address == My_Address)
                        THEN
                            BEGIN
                                signal TP_Wait /*TP(02) */
                            END
                    IF(SBA_Slave_Address != My_Address)
                        THEN
                            BEGIN
                                signal TP_Hold /* TP(00b) */
                            END
                    END
            END
```

The Init_Actions queue an RAF Request Allocation message for a NULL allocation. From the RAF Request Allocation response, the HA-3PR learns the address of the SBA-master. If the SBA-master address (SBA_Master_

Address) is equal to the local address (My_Address), the HA-3PR asserts the TP_Start signal, and transits from the STANDBY state to the ACTIVE state. The Normal_Actions, listed hereafter, are performed upon this transition:

/* Registration */
/* Translation of allocation request */
/* Setting of allocation in the synchronous node */
/* Monitoring of FDDI ring */

If the SBA-master address (SBA_Master_Address) is different from the local address, the Init_Actions queue an PMF Get request for IBM attribute ibmPATHHA_Slave_Addr. From the PMF Get response, the HA-3PR learns the address of the SBA-slave. If the SBA-slave address (SBA_Slave_Address) is different from the local address (My_Address), the HA-3PR asserts the TP_Hold signal, and the HA-3PR is stopped. If the SBA-slave address is equal to the local address, the HA-3PR asserts the TP_Wait signal, and transits from the STANDBY state to the BACKUP state. The Hello_3PR_Actions listed below are performed upon this transition:

```
/* TP(22a) */
    IF(TP_Input == Hello_Request)
        THEN
            BEGIN
                start THR timer
            END
/* TP(22b) */
    IF(TP_Input == Hello_Response)
        THEN
            BEGIN
                stop THR timer
            END
/* TP(22c) */
    IF(THR > T_Hello)
        THEN
            BEGIN
                signal TP_Get /* TP(23) */
            END
```

Each time a hello request message is transmitted by the SBA-slave to the SBA-master, the HA-3PR receives an hello request message. Each time a hello response message is transmitted by the SBA-master to the SBA-slave, the HA-3PR receives an hello response message. In case of failure of the SBA-master (no hello response message received on time), the HA-3PR asserts the TP_Get signal, and transits from the BACKUP state to the GET state. The Get_Actions listed below are performed upon this transition:

```
/* Send an PMF Get to obtain the value of attribute */
/* fddiPATHSbaAvailable of the local SBA (SBA-slave) */
send PMF Get request (fddiPATHSbaAvailable)
clear Get_cnt
start TSW timer
/* TP(33a) */
IF(TP_input == Get_Response)
    THEN
        BEGIN
            IF(fddiPATHSbaAvailable != 0)
                THEN
                    BEGIN
                        /* local SBA is the SBA-master */
                        stop TSW timer
                        signal TP_Start /* TP(31) */
                    END
            IF(fddiPATHSbaAvailable == 0)
                THEN
                    BEGIN
                        /* local SBA is still the SBA-slave */
                        increment Get_cnt
```

```
            END
        END
/* TP(33b) */
IF(TSW > T_Switch) & (Get_cnt < N_Get)
    THEN
        BEGIN
            /* the number of PMF Get to send is not */
            /* reached */
            send PMF Get request (fddiPATHSbaAvailable)
        END
IF(TSW > T_Switch) & (Get_cnt == N_Get)
    THEN
        BEGIN
            /* local SBA is still the SBA-slave and */
            /* the SBA switch fails */
            signal TP_Wait /* TP(32) */
        END
```

The Get_Actions queue an PMF Get request message for attribute fddiPATHSbaAvailable (as defined in the SMT standard) of the local SBA and monitors this attribute as following: the value of this attribute is equal to zero when the local SBA is SBA-slave, and the value of this attribute is different from zero when the local SBA (previously the SBA-slave) becomes the SBA-master. In this case the HA-3PR asserts the TP_Start signal, and transits from the GET state to the ACTIVE state. If the fddiPATHSbaAvailable is still equal to zero when time is expired, the HA-3PR asserts the TP_Wait signal, and transits from the GET state to the BACKUP state.

The invention includes the following modifications to the variables, signals, flags, counters, and timers used within High Availability Third Party Requestor (HA-3PR):

VARIABLES

A variable shall take on one value from a limited set of possible values. When a variable is cleared, the value of the variable becomes "none". Variables may be exported outside of Third Party Requestor.

TP_Input: A variable from 3PR Frame Parser indicating the type of SMT information to be processed. The 3PR shall queue the TP_Input variable each time it changes value and process them in the order received. The TP_Input is processed from the ACTIVE State, the BACKUP state, and the GET state and has the following values.

RAF_Response - The TP_Input variable is set to RAF_Response when an RAF Request Allocation response message is received in the STANDBY state, state zero.

Hello_Request - The TP_Input variable is set to Hello_Request when an Hello request message is received in the BACKUP state, state two.

Hello_Response - The TP_Input variable is set to Hello_Response when an Hello response message is received in the BACKUP state, state two.

Get_Response - The TP_Input variable is set to Get_Response when an PMF Get response message is received in the GET state, state three.

SIGNALS

A signal is used to initiate a state change within Third Party Requestor. A signal causes the state change to occur and does not have to be cleared following its usage. A signal is local to Third Party Requestor and may not be exported. The signals used to drive the HA-3PR state diagram are generated by the supporting 3PR system.

TP_Start - A signal internal to HA-3PR used to transition to the ACTIVE State.

TP_Wait - A signal internal to HA-3PR used to transition to the BACKUP state.

TP_Get - A signal internal to HA-3PR used to transition to the GET state.

FLAGS

A flag is a variable that shall take on one of two values: set or cleared. Flags are assigned values within the HA-3PR state diagram by specifying a set or clear operation. Flags are tested within the HA-3PR state diagram by checking their status or the negation of their status. Transitions initiated by flags need only be checked upon initial entry into the state and upon change to the flag. The value of a flag may be exported outside of HA-3PR.

Operational Flags

Begin_Flag - A flag internal to HA-3PR used to direct the Init_Actions to transmit an RAF Request Allocation request message with a NULL SBA Payload.

TIMERS

Timer Functions

THR - Timer High Availability 3PR - THR is initialized at station initialization. HA-3PR maintains a THR timer for one purpose, to trigger Hello request messages.

TW - Timer SBA Switch - TSW is initialized at station initialization.

HA-3PR maintains a TSW timer to handle the switching time between SBA-Slave and SBA-Master.

Timer Expiration Values

T_Hello - 1 minute

T_Switch - 1 minute

COUNTERS

Counter Functions

Get_cnt - Get_cnt is initialized at station initialization. This counter controls the number of PMF Get requests that are transmitted in the GET state.

Counter Expiration Values

N_Get - The number of PMF Get request retries.

N_Get default=3

The detailed description of the states of High Availability Third Party Requestor (HA- 3PR) follows:

State TP0: STANDBY

The HA-3PR process begins in the Standby State. In this state, the HA-3PR send an RAF Request Allocation request and waits for the reception of the RAF Request Allocation response to learn the individual address of the SBA-master (SBA_Master_Address), and the individual address of the SBA-slave (SBA_Slave_Address).

TP(00a): Start3PR - A transition to the STANDBY state is made when the HA-3PR is started. The Begin_Flag has been set during the initialization of HA-3PR.

TP(00b): Stop3PR - A transition back to the STANDBY state is made when the TP_Hold signal is asserted. The HA-3PR is stopped.

TP(00c): ProcessRAFResponse - A transition back to the STANDBY state is made when the variable TP_Input is set to RAF_Response. The Init_Actions are performed upon this transition.

TP(01) Start3PRMaster - A transition to the ACTIVE state is made when the TP_Start signal is asserted. The Normal_Actions are performed on this transition.

TP(02) Start3PRSlave - A transition to the BACKUP state is made when the TP_Wait signal is asserted. The Hello_3PR_Actions are performed on this transition.

State TP1: ACTIVE In this state the HA-3PR performs the following actions the same as a standard 3PR:

Registration to QoS Allocator

Receive and translate allocation information from the QoS Allocator

Monitor the FDDI segment

State TP2: BACKUP

The HA-3PR enters the BACKUP state after the TP_Wait signal is asserted. From this state the HA-3PR listen the FDDI ring and more specifically the Hello messages to detect any failure from the SBA-master.

TP(22a): ProcessHelloRequest - A transition back to the BACKUP state is made when the variable TP_Input is set to Hello_Request. The Hello_3PR_Actions are performed upon this transition.

TP(22b): ProcessHelloResponse - A transition back to the BACKUP state is made when the variable TP_Input is set to Hello_Response. The Hello_3PR_Actions are performed upon this transition.

TP(22c): HelloTimeOut - A transition back to the BACKUP state is made when the timer THR expires. The Hello_3PR_Actions are performed upon this transition.

TP(23): SendGetRequest - A transition to the GET state is made when the TP_Get signal is asserted. The Get_Actions are performed on this transition.

State TP3: GET

In this state, the HA-3PR monitors the value of the MIB attribute fddiPATHSbaAvailable in order to detect when the SBA-Slave is the SBA-master.

TP(31): Start3PRMaster - A transition to the ACTIVE state is made when the TP_Start signal is asserted. The Normal_Actions are performed on this transition.

TP(32): Start3PRSlave - A transition to the BACKUP state is made when the TP_Wait signal is asserted. The Hello_3PR_Actions are performed on this transition.

TP(33a): ProcessGetResponse - A transition back to the GET state is made when the variable TP_Input is set to Get_Response. The Get_Actions are performed upon this transition.

TP(33b): SwitchTimeOut - A transition back to the GET state is made when the timer TSW expired. The Get_ Actions are performed upon this transition.

While there has been described what is considered to be a preferred embodiment of the present invention, variations and modifications in that embodiment will occur to those skilled in the art once they are made aware of the inventive concepts. Therefore, it is intended that the appended claims shall be construed to include both the preferred embodiment and all such variations and modifications as fall within the true spirit and scope of the invention.

What is claimed is:

1. In a data communication network including at least one FDDI segment, a server connected to the FDDI segment, a Quality of Service (QoS) Requester application running on the server, a network bandwidth allocator comprising a QoS Allocator for receiving and responding to allocation requests from the QoS Requestor application, a first synchronous bandwidth allocator which normally operates in a master state to provide allocation services to on said FDDI segment, a second synchronous bandwidth allocator which normally operates in a backup state from which it can assume the master state upon the unavailability of said first synchronous bandwidth allocator, and a first 3rd Party Requestor for providing an interface between said first synchronous bandwidth allocator and each of said network bandwidth allocator and said server, an improvement for assuring high availability of network-wide bandwidth allocation capability comprising a second 3rd Party Requestor associated with said second synchronous bandwidth allocator, said second 3rd Party requestor maintaining the same state as the second synchronous bandwidth allocator.

2. A system for providing high availability of bandwidth in a domain comprising a plurality of local area networks within at least one FDDI segment interconnecting at least two of such local area networks, said system comprising:

a centralized bandwidth allocator for dealing with allocation requests over the domain;

at least one requesting device capable of requesting an allocation of bandwidth over the FDDI segment;

a first device connected to the FDDI segment and comprising a first synchronous bandwidth allocator for dealing with allocation requests by each such requesting device and a first third party requester for providing an interface between such requesting device and the centralized bandwidth allocator;

a second device connected to the FDDI segment, said second device being capable of requesting an allocation of FDDI segment bandwidth;

a third device connected to the FDDI segment and comprising a second synchronous bandwidth allocator, said second synchronous bandwidth allocator receiving current allocation information from said first synchronous bandwidth allocator, said second synchronous bandwidth allocator being adapted to control bandwidth allocation if the first synchronous bandwidth allocator becomes unavailable; and a second third party requestor associated with said second synchronous bandwidth allocator, said second third party requester providing the interface between requesting devices and the centralized bandwidth allocator whenever the second synchronous bandwidth allocator is providing bandwidth allocation.

3. A system according to claim 2 wherein said second third party requester further includes:

means for monitoring information exchanged over the FDDI segment between the first synchronous bandwidth allocator and the second synchronous bandwidth allocator;

means for decoding information provided by the second synchronous bandwidth allocator to determine whether said second synchronous bandwidth allocator has assumed the role of providing bandwidth allocation, said decoding means bringing the state of the second third party requestor to the same state as the second synchronous bandwidth allocator.

* * * * *